United States Patent
Watson

[11] 3,765,269
[45] Oct. 16, 1973

[54] ROTARY MECHANICAL TRANSLATING DEVICE EMPLOYING ROTARY RELEASERS

[76] Inventor: Thomas A. W. K. Watson, 2720 Gover Apt. 24, Montreal, Quebec, Canada

[22] Filed: June 30, 1971

[21] Appl. No.: 158,250

[52] U.S. Cl. ................................................. 74/682
[51] Int. Cl. ............................................ F16h 37/06
[58] Field of Search ....................................... 74/682

[56] References Cited
UNITED STATES PATENTS

| | | | |
|---|---|---|---|
| 2,771,286 | 11/1956 | Clark, Jr. | 415/30 |
| 2,384,776 | 9/1945 | Trofimov | 74/689 |
| 2,665,596 | 1/1954 | Varble | 74/756 |
| 2,957,371 | 10/1960 | Wang | 74/756 |
| 3,046,814 | 7/1962 | Soehrman | 74/689 |
| 3,119,282 | 1/1964 | Raze | 74/682 |
| 3,242,769 | 3/1966 | Johnson | 74/682 |
| 3,299,741 | 1/1967 | Twiford | 74/682 |
| 3,318,172 | 5/1967 | Cummins | 74/682 |
| 3,645,152 | 2/1972 | Olcer | 74/682 |

Primary Examiner—C. J. Husar

[57] ABSTRACT

A rotary mechanical translating device may be defined as a purely mechanical device which transfers power from a prime mover to a load as a magnified function of a displacement at its input. The device exhibits a power gain and may be employed to produce mechanical amplification. A change in angular velocity of its input will result in a change in the angular velocity of its output.

4 Claims, 3 Drawing Figures

PATENTED OCT 16 1973 3,765,269

Thomas A. W. K. Watson

ROTARY MECHANICAL TRANSLATING DEVICE EMPLOYING ROTARY RELEASERS

The instant invention discloses a translating device capable of bilateral mechanical amplification wherein the device provides mechanical amplification through itself in either direction. It is a completely mechanical device having a first and a second shaft, and is driven by a prime mover.

Drive applied to one of its shafts results in power being transferred from the prime mover to a load connected to its other shaft as a magnified function of the applied drive. The translating device is completely symmetrical hence its first shaft may be driven and a load connected to its second shaft; an instant later a load may be connected to its first shaft and drive to its second shaft.

It comprises two differentials driven by a prime mover and interconnected nected by a rotary releaser. The rotary releaser is a device having two shafts, the rotation of one shaft only being possible when a moment is applied to its other shaft. It comprises two self locking worms meshed with a worm gear.

The invention relates to Rotary Mechanical Translating Devices which produces mechanical amplification. It more specifically relates to translating devices capable of bilateral mechanical amplification wherein amplification occurs through itself in either direction. The elementary form of the device is known wherein a worm and worm gear control the release of one shaft of a differential driven by a prime mover. The worm and worm gear has been replaced by a rotary releaser producing essentially the same results. A second differential is then interconnected with the first differential and the rotary releaser producing previously unattainable bilateral mechanical amplification.

In one embodiment it may comprise a single differential having a first, a second and a third connection means and a meshed first self locking worm and worm gear meshing with a second self locking worm. The first worm is connected to the first connection means of the differential. In operation a prime mover is connected to the second connection means and a load to the third connection means of the differential. An input control means is connected to the second worm.

The rotary releaser serves as a means against which the output differential may react, so as to develop output torque, and as a means of preventing the torque from appearing in the input. In this arrangement the output speed is inversely proportional to the input speed. A load must be present on the output so as to transfer a rotary moment through the differential to the first connection means of the rotary releaser.

The rotary releaser has the characteristic of releasing a rotary moment applied to one of its connections when the other connection is rotated in the correct direction. It will resist rotation of one of its connection's if the other connection is not rotated. It normally has a speed transfer ratio of one to one due to its symmetrical characteristics. It is possible to construct them with other ratios however.

When the first worm is not driven the first connection of the differential is held stationary by the self locking characteristics of of the releaser. Power at maximum speed is then transferred from the prime mover through the differential to the output. When the second connection of the releaser is driven in the same direction as the first connection is tended to be driven by the differential, a releasing action will occur and the output speed of the translating device will be reduced, due to differential action. Little effort compared to the power being transferred to the output will be required to rotate the releaser in this direction. The releaser speed of rotation may be increased until the speed of the output connection of the translating device drops to zero. If an attempt is made to rotate the input faster, the releaser will lock, hence resisting any increase in its angular velocity. The useful range of amplification of the device is between the conditions where either the input or output has no angular velocity.

The second connection means of the releaser cannot be driven backwards since its first connection means has a moment applied to it in the forward direction.

This rotary translating device may be employed with a small speed controller to form a manual transmission. In this application, the controller will be required to provide an input speed to the rotary translating device inversely proportional to the required output speed. The speed controller will be required to handle only a fraction of the power transferred to the output due to the amplification characteristics of the rotary translating device. Both the speed controller and the rotary translating device may be driven from the same prime mover. The output of the speed controller is fed into the input of the rotary translating device.

In another embodiment it comprises a first and a second differential, each having a first, a second and a third connection means and a rotary releaser having a first and a second connection means. The first connection means of the releaser is connected to the first connection means of the first differential and the second connection means of the releaser is connected to the first connection means of the second differential. In operation a prime mover is connected to the second connection means of both differentials, a load is connected to the third connection means of the first differential and an input control means to the first connection means of the second differential. This translating means is symmetrical, hence the inputs and outputs may be interchanged. It amplifies in both direction through itself.

The second differential's drive to the first differential, and the drive from the prime mover to the first differential, cancels each other. This results in no output when the input control means is held stationary. Rotation of the input in the direction that reduces the second differential's drive, to the first differential, unbalances the system. This results in the device transferring power from the prime mover to the load. The third connection of both differentials have to be partially loaded at all times so as to exhibit resistance to overcome the resistance of the releaser. This will permit the differential to drive the releaser rather than their third connection.

This particular rotary mechanical translating device is unidirectional. It may be operated in the reverse direction, by reversing the direction of the prime mover. A second rotary releaser may be connected to the third connection means of the second differential. This particular translating device will amplify in one direction through itself since motion cannot be transferred through the second releaser.

Rotary translating devices may be employed in mechanical amplifiers, transmissions, speed regulators, positioning devices, control systems, etc., or as building blocks for more complex amplifier systems.

The primary objective is to provide a means of rotary mechanical amplification. Another objective is to provide a unidirectional rotary translating device which amplifies in both directions through itself. Another objective is to provide a rotary translating device whose output's angular velocity is inversely proportional to its input's angular velocity. Further objectives and advantages will become apparent in the following description.

Figure 1:
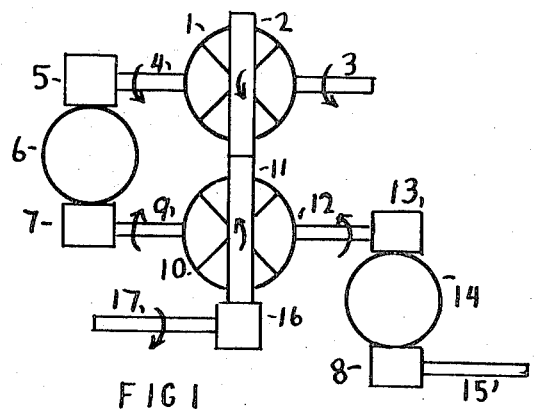
FIG. 1 is a schematic diagram of a unidirectional rotary mechanical translating device.

FIG. 1 shows a rotary translating device. A prime mover input shaft 17 is connected to gear 16 which drives spider gear 11 of differential 10. One end gear of differential 10 is connected to shaft 9 and its other end gear is connected to shaft 12. Shaft 9 is connected to worm 7 which co-operates with worm gear 6, worm gear 6 co-operates with worm 5 attached to shaft 4 connected to an end gear of differential 1. Spider gear 2 of differential 1 co-operates with gear 11. Shaft 3 connected to the other end gear of differential 1 acts as an output shaft. Shaft 12 is connected to worm 13 which meshes with worm gear 14. Worm gear 14 meshes with worm 8 attached to input shaft 15.

The arrows show the relative direction of rotation of the shafts. Reversing the direction of rotation of the prime mover will reverse the direction of operation of the unidirectional rotary mechanical translating device.

When the input shaft 15 is not rotated it causes worm gear 14 to lock against worm 8, hence locking shaft 12. Shaft 9 is then driven by differential 10 at its maximum velocity driving worm 7 which drives worm gear 6. Rotation of the worm 5 permits the rotation of gear 6. Differential 1 drives shaft 4 when there is a load on shaft 3. Shaft 4 is driven at the same velocity as shaft 9. This causes a balance condition to exist which results in zero rotation of the output shaft.

Rotation of the input shaft 15 results in worm 8 releasing worm gear 14. Worm 13 is driven by shaft 12 against worm gear 14, hence little effort is required to rotate the input shaft in the direction in which it is tended to be driven. The rotation of worm gear 13 in the direction shown allows shaft 12 to rotate resulting in the slowing down of shaft 9 as a consequence of differential action. This slows down shaft 4 and upsets the balance condition in differential 1 resulting in rotation of the output shaft 3.

When the input shaft 15 is rotated at a sufficiently high enough velocity to balance out the rotation of shaft 9, worm gear 6, worms 5 and 7 and shaft 4 stall. The output shaft 3 is then driven at full velocity by the prime mover through differential 1. Disconnecting worm 13 and allowing shaft 12 to rotate freely would have the same effect.

Rotation of the output shaft 3 occurs only when the input shaft 15 is rotated. The prime mover supplies the power that drives the output shaft 3. Shaft 15 acts to control the speed at which the prime mover drives shaft 3. Since little effort is required to rotate the input shaft and the output shaft is driven by the prime mover, mechanical amplification results. Gear ratios may be selected to provide the required amount of rotation of the output shaft for given angular changes in the input shaft.

Figure 2:
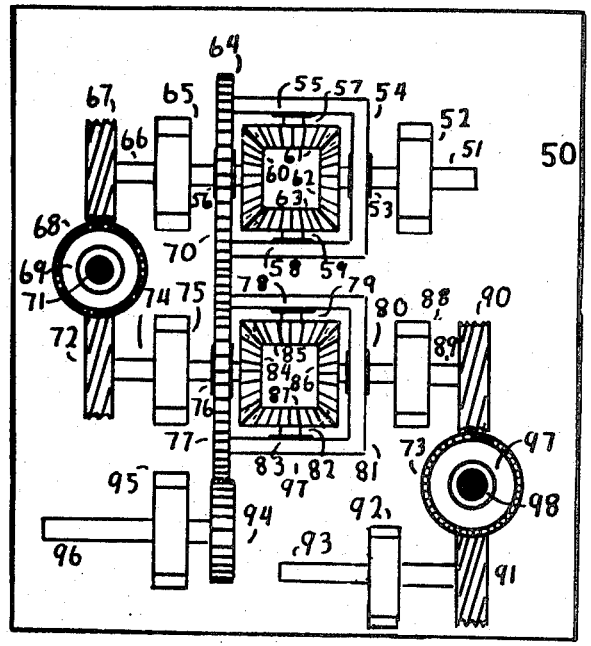
FIG. 2 is a plan view of a unidirectional rotary mechanical translating device.

FIG. 2 shows the construction of the rotary mechanical translating device depicted in the schematic diagram of FIG. 1. Bearing blocks 52, 65, 75, 88, 92 and 95 are all mounted to base 50. An output shaft 51 runs in bearing 52 and bearing 53 mounted to housing 54 of the output differential 70. A bevel gear 62 is fastened to shaft 51 and meshes with bevel gears 61 and 63 mounted on stub axels 57 and 59 which rotates in bearings 55 and 58 respectively mounted in housing 54. A bevel gear 60 meshes with gears 61 and 63 and is fastened to shaft 66 which runs in bearing 56 mounted on the spider gear 64 and bearing 65. Housing 54 is attached to the spider gear 64. A worm 67 is fixed to shaft 66. A worm gear 68 mounted on bearing 69 on shaft 71 meshes with worms 67 and 72. Shaft 71 is fixed to base 50. Shaft 74 runs in bearing 75 and bearing 76 mounted on spider gear 77 to which is mounted housing 81. A bevel gear 84 is fastened to shaft 74 and meshes with bevel gears 85 and 87 mounted on stub axels 79 and 82 which run in bearings 78 and 83 respectively. Bearings 78, 80 and 83 are mounted in housing 81. A bevel gear 86 meshes with gears 85 and 87 and is fastened to shaft 89 which runs in bearings 80 and 88. A worm 90 is fastened to shaft 89 and meshes with worm gear 73. Worm gear 73 runs on bearing 97 mounted on shaft 98 fixed to base 50. Worm 91 meshes with worm gear 73 and is fixed to the input shaft 93 which runs in bearing 92. A gear 94 is attached to the prime mover input shaft 96 which runs in bearing 95. Gear 94 drives spider gear 77 of the input differential 97 which in turn drives the spider gear 64.

An external prime mover applies power to the input shaft 96. The input shaft 93 controls the rotation of the output shaft 51 which derives its power from shaft 96.

Figure 3:
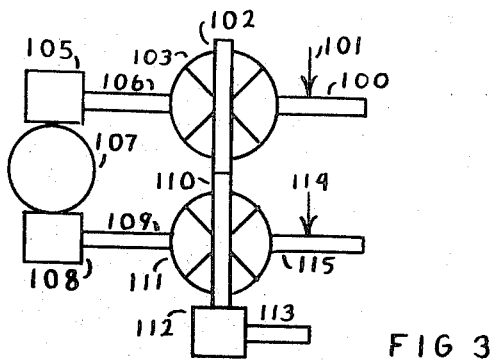
FIG. 3 is a schematic diagram of a unidirectional rotary mechanical translating device capable of amplifying in both directions through itself.

FIG. 3 shows the spider gear 102 of differential 103 meshed with the spider gear 110 of differential 111. A prime mover input shaft 113 is fixed to gear 112 and is meshed with gear 110. Shaft 115 is connected to one of the end gears of differential 111 and it is partially loaded by the frictional element 114. Shaft 109 is connected to the other end gear of differential 111 and is fixed to worm 108. Worm gear 107 meshes with worm 108 and 105. A shaft 106 is connected to one of the end gears of differential 103 and is fixed to worm 105. Shaft 100 is connected to the other end gear of differential 103 and is partially loaded by frictional element 101.

The frictional elements 101 and 114 provide sufficient loading to prevent the rotation of shaft 100 and 115, thereby permitting the differential 103 and 111 to drive the rotary releaser comprised of worms 105 and 108 and worm gear 107. The resistance of the frictional elements is made somewhat greater than the resistance presented by the rotary releaser.

If shaft 101 is rotated it reduces the angular velocity of shaft 106. This in turn reduces the speed of shaft 109 as a result of the rotary releaser action, hence causing the rotation of shaft 114 due to differential action. The effort required to drive shaft 101 is that required to overcome the remaining resistance of the frictional element 101.

The output of shaft 115 is that derived from the prime mover minus the remaining resistance of the frictional element 114. Since the remaining resistance of the frictional elements can be made relatively small and the prime mover can supply considerably more power to shaft 115 than the effort required to turn shaft 100 amplification occurs.

The device is symmetrical, hence if shaft 115 is rotated then shaft 100 will rotate delivering power to any load to which it is connected. This particular translating device amplifies in both directions through itself.

A translating device whose output angular velocity is an inverse function of its input angular velocity may be constructed from elements 105, 106, 107, 108, 109, 110, 111, 112, 113, 114 and 115 of FIG. 3. In this arrangement shaft 106 acts as an input control shaft and shaft 115 as an output shaft.

In operation shaft 114 rotates when there is no input to shaft 106. A rotational moment is present in worm 108 as a result of the torque developed in shaft 115 due to the load presented by the frictional element 114. The rotary moment applied to worm 108 is released when worm 105 is rotated.

Rotation of the input shaft 106 or worm 105 will therefore permit rotation of worm 108 or shaft 109. When shaft 109 rotates the speed of shaft 115 drops, hence the output angular velocity of this translating device is inversely proportional to its input angular velocity. Since little effort is required to rotate the input shaft and the output power is derived from the prime mover, amplification occurs.

The frictional elements 101 and 114 in all forms of the translating device may be eliminated if the load to which the shaft 101 and 115 is connected presents sufficently high resistance. In some applications only one of the frictional elements 101 or 114 may be required.

The rotary releaser comprised of worms 105 and 108 and worm gear 107 may be replaced by a rotary releaser derived from a twin worm gear. Worms 105 and 108 may be each replaced by a helical element having a fine pitch and worm gear 107 by a helical element having a coarse pitch wound in the opposite direction. The helical elements with the fine pitch each mesh with the helical element with the coarse pitch. The pitch of the fine pitch helical elements is such that it presents a self locking characteristic when meshed with the element with the coarse pitch. It is more efficient than the device employing worms and a worm gear.

I claim:

1. A rotary mechanical translating device, comprising a rotary releaser having two connections wherein rotation of one connection is only possible when a moment is applied to its other connection, and vice versa, a differential having a first, a second and a third connection, said rotary releaser connected between said first connections of both differentials, and prime mover means for driving said second connections of both differentials, wherein bilateral mechanical amplification occurs such that power is transferred from the prime mover to the third connection of the first differential as a magnified function of an external drive applied to the third connection of the second differential, and also power may be transferred from the prime mover to the third connection of the second differential as a magnified function of an external drive applied to the third connections of the first differential.

2. A rotary mechanical translating device as claimed in claim 1, comprising a first means for resisting rotation connected to the third connection of the first differential.

3. A rotary mechanical translating device as claimed in claim 2, comprising a second means for resisting rotation connected to the third connection of the second differential.

4. A rotary mechanical translating device as claimed in claim 1, comprising a second rotary releaser connected to the third connection means of the first differential.

* * * * *